United States Patent [19]

de Jong

[11] Patent Number: 4,784,372
[45] Date of Patent: Nov. 15, 1988

[54] TRACTION SHEAVE

[75] Inventor: Johannes de Jong, Järvenpää, Finland

[73] Assignee: Elevator GmbH, Switzerland

[21] Appl. No.: 85,222

[22] Filed: Aug. 13, 1987

Related U.S. Application Data

[63] Continuation of Ser. No. 779,579, Sep. 24, 1985, abandoned.

[30] Foreign Application Priority Data

Sep. 24, 1984 [FI] Finland ............................... 843749

[51] Int. Cl.⁴ ............................................. B66D 1/14
[52] U.S. Cl. .................................... 254/277; 254/414; 464/83; 464/138
[58] Field of Search .............. 254/390, 391, 392, 404, 254/414, 416, 277; 187/95, 20; 474/94, 901, 902, 903; 464/83, 85, 137, 138

[56] References Cited

U.S. PATENT DOCUMENTS

| 1,872,136 | 8/1932 | Gibson | 474/94 |
| 2,622,418 | 12/1952 | Howison | 474/94 |
| 3,067,596 | 12/1962 | Caunt | 464/138 X |
| 3,332,665 | 7/1967 | Bruno | 254/416 |
| 3,641,832 | 2/1972 | Shigeta et al. | 187/20 X |
| 4,030,569 | 6/1977 | Berkovitz | 187/20 |

FOREIGN PATENT DOCUMENTS 12669 6/1980 European Pat. Off. .............. 464/83

Primary Examiner—Stuart S. Levy
Assistant Examiner—Joseph J. Hail, III

[57] ABSTRACT

A traction sheave in particular for a lift moving machinery, by which the torque is transmitted from the machinery shaft to the ropes supporting the lift cage. The problem in lift traction sheaves of prior art with rigid construction is their objectionably strong tangential vibration, due to the machinery. In the invention this problem has been solved in that the outer rim of the traction sheave is connected to a flange on a hub by the aid of at least one elastic element, and that the outer rim is rotatably carried on the hub.

4 Claims, 1 Drawing Sheet

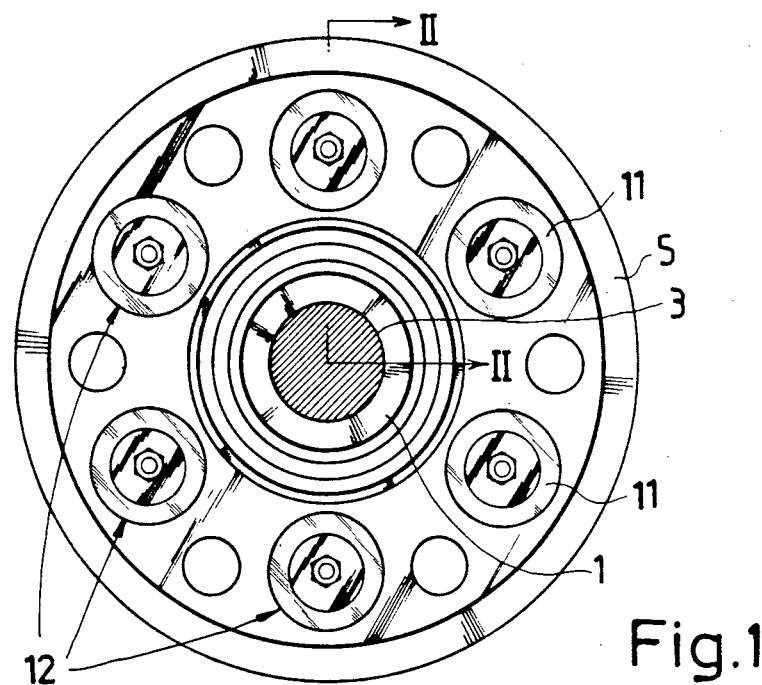
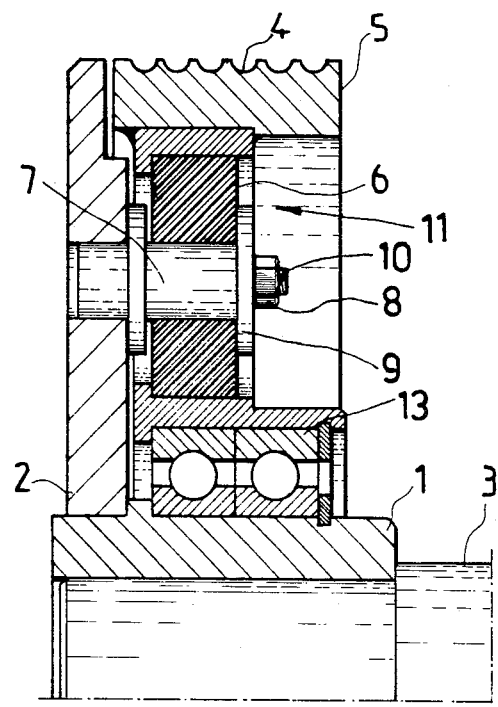

TRACTION SHEAVE

This application is a continuation of application Ser. No. 779,579 filed Sept. 24 1985 now abandoned.

BACKGROUND OF THE INVENTION

The present invention concerns a traction sheave, in particular for the drive machinery of lifts, by said traction sheave being effected torque transfer from the machinery shaft to the ropes supporting the lift cage.

Heretofore, rigid, unelastic rope wheels have been used for lift traction sheaves. The friction between the ropes and the traction sheave gives rise to vibration, which is objectionably strong in existing rope wheels. Moreover, abrupt stops of the lift cause powerful jolts, which a traction sheave of rigid construction transmits to the machinery thereby causing wear of the machinery.

OBJECT OF THE INVENTION

The object of the present invention is to provide a traction sheave in which said vibration is substantially reduced and which also damps the jolts resulting from starting and stopping, whereby the impact of the lift's gear transmission will be less. The traction sheave of the invention is therefore characterized in that the outer rim of the traction sheave is connected to a flange mounted on the hub with the aid of at least one elastic element, and that the outer rim is rotatably carried on the hub.

An advantageous embodiment of the invention is characterized in that the elastic element is so fixed that it damps the vibrations of the apparatus in the direction tangential to the traction sheave.

Another advantageous embodiment of the invention is characterized in that the elastic element consists of coperipheral element sections which, separately, consist of rubber and of a cantilever beam, the latter connecting the outer rim to the flange.

A third advantageous embodiment of the invention is characterized in that the flange and the assembly have been attached together with the aid of a threaded pin projecting from the cantilever beams with the aid of a nut screwed on this pin and a washer provided between the nut and rubber blocks.

One further advantageous embodiment of the invention is characterized in that the frequency of the tangential vibration of the traction sheave is adjustable by regulating the inertia of the outer rim or by using elastic elements with different spring constants.

The most important advantage of the invention that may be mentioned is substantial reduction of the tangential vibration, yet retaining a simple construction. At abrupt starts and stops of the lift, the elastic traction sheave considerably attenuates the jolt and thereby saves the lift's gear transmission.

BRIEF DESCRIPTION OF THE DRAWINGS

In the following, the invention is described more in detail, referring to the attached drawing, wherein FIG. 1 presents a traction sheave according to the invention, in elevational view.

FIG. 2 shows the section along line II—II in FIG. 1.

DESCRIPTION OF THE PREFERRED EMBODIMENT

In the figures is depicted a lift traction sheave according to the invention, having rope grooves 4 on its outer rim 5. By action of the friction between the ropes and the traction sheave, the traction sheave imparts motion to the lift ropes. In the hub 1 of the traction sheave has been mounted a secondary shaft 3, which transmits the rotary motion to the traction sheave. On a given radial distance from the centre of the traction sheave has been disposed a certain number of cantilever beams 7, for instance six of them. The cantilever beams have been surrounded with rubber parts 6 so that each cantilever beam is surrounded by at least one rubber ring. The rubber rings are located on the same level with the outer rim 5 in axial direction of the traction sheave. The outer rim 5, the rubber rings 6 and the cantilever beams 7 constitute an assembly which is rotatably carried on the hub 1.

The other end of the cantilever beams is fixedly attached to a single-centre flange 2, in its turn fixedly mounted on said hub 1. The torque acting on the outer rim 5 is transmitted to the hub 1, and thence to the secondary shaft 3, over the rubbers 6, the cantilever beams 7 and the flange 2. The bearing arrangement of the outer rim on the hub 1 permits a slight tangential motion, which considerably reduces the tangential vibration of the traction sheave.

The frequency of said tangential vibration is adjustable by regulating the inertia of the outer rim or by using a rubber 6 with appropriate elastic spring constant, or by altering the number of rubber rings. One possibility by which the inertia may be regulated is regulating the mass, that is, adding to or subtracting from the mass of the traction sheave's outer rim, as required.

Exchanging the rubber rings is extremely simple, as can be understood with reference to FIG. 2. The nut 8, drawn tight on the threaded pin 10, is unscrewed and the washer 9 taken off. Hereafter, the rubber 6 can be taken out of its housing.

It is obvious to a person skilled in the art that the invention is not confined to the above-mentioned embodiment examples and that it may instead be varied within the scope of the claims following below.

I claim:

1. A traction sheave, in particular for a lift moving machinery, by which torque is transmitted from a machinery shaft to ropes supporting a lift cage, said sheave being constructed to reduce vibration caused by friction between the ropes and the sheave and which is tangentially directed with respect to the machinery shaft, said sheave comprising a hub connected with said machinery shaft and surrounding same and extending axially along and overlying said shaft, bearing means having an outer rotatable race and an inner race fixedly mounted upon said hub, a monolithic outer rim surrounding said shaft and extending axially along and overlying said shaft, said outer rim having grooves for said ropes and being fixedly connected to said bearing means outer race whereby the whole outer rim extends axially along and overlies said shaft and is rotatably carried on said hub, a flange fixed on said hub and surrounding said hub, and at least one elastic element connected between said outer rim and said flange, said at least one elastic element being located radially outward of said hub and spaced from said flange axially along said shaft and extending axially along and overlying said shaft, beam means mounted on said flange for rotatably carrying said elastic element on said hub, means located between said outer rim and said outer race holding said elastic element in position spaced axially from said flange, the outer rim, the elastic element, the bearing means, the hub and the shaft all being interconnected in the radial direction with respect to said shaft whereby forces directed radially of the outer rim by ropes in the grooves are transferred to said shaft in a radially inward direction and the whole outer rim is vibration damped.

2. a traction sheave according to claim 1, wherein said elastic element is rotatably carried on said hub to permit a slight tangential motion of the outer rim such that it damps vibrations of the traction sheave in a tangential direction.

3. A traction sheave according to claim 1, wherein there are a plurality of said elastic elements and beam means.

4. A traction sheave according to claim 3 wherein each beam means has an attaching means associated therewith, with each attaching means including a threaded pin projecting from each beam means, a nut screwed on said pin, and a washer inserted between the nut and the elastic element associated with each attaching means, the flange and assembly associated with each attaching means and washer being tightened by the nut associated with each attaching means.

* * * * *